United States Patent
Huff et al.

[11] Patent Number: 6,032,204
[45] Date of Patent: Feb. 29, 2000

[54] MICROCONTROLLER WITH A SYNCHRONOUS SERIAL INTERFACE AND A TWO-CHANNEL DMA UNIT CONFIGURED TOGETHER FOR PROVIDING DMA REQUESTS TO THE FIRST AND SECOND DMA CHANNEL

[75] Inventors: Ronald M. Huff; John P. Hansen, both of Austin, Tex.

[73] Assignee: Advanced Micro Devices, Inc., Austin, Tex.

[21] Appl. No.: 09/036,868

[22] Filed: Mar. 9, 1998

[51] Int. Cl.[7] ............................. G06F 12/00; G06F 13/00; G06F 15/16

[52] U.S. Cl. ............................. 710/23; 710/20; 710/21; 710/22; 710/61; 709/212; 709/400

[58] Field of Search ................... 709/212, 400; 710/20, 21, 22, 23, 61

[56] References Cited

U.S. PATENT DOCUMENTS

| | | | |
|---|---|---|---|
| 4,782,439 | 11/1988 | Borkar et al. | 364/200 |
| 4,942,559 | 7/1990 | Fleck et al. | 368/113 |
| 5,167,367 | 12/1992 | Holland et al. | 365/219 |
| 5,388,237 | 2/1995 | Sodos | 395/425 |
| 5,448,743 | 9/1995 | Gulick et al. | 395/869 |
| 5,497,501 | 3/1996 | Kohzono et al. | 395/849 |
| 5,613,162 | 3/1997 | Kabenjian | 395/842 |
| 5,655,151 | 8/1997 | Bowes et al. | 395/842 |
| 5,727,233 | 3/1998 | Lynch et al. | 395/885 |
| 5,826,101 | 10/1998 | Beck et al. | 395/800.34 |
| 5,860,161 | 1/1999 | Hansen | 711/211 |
| 5,896,549 | 4/1999 | Hansen | 395/842 |

FOREIGN PATENT DOCUMENTS 401073858A  3/1989  Japan ............................. H04M 15/38

OTHER PUBLICATIONS

*Using the Am186™ES and Am188™ES Microcontrollers in Communications Applications,* Advanced Micro Devices, Inc., Apr. 2, 1997.
*Am186™ES/ESLV and Am188™ES/ESLV,* Advanced Mirco Devices, Inc., Publication 20002, Rev. B, Amendment /0, Feb. 1997, pp. 1 through 12, pp. 25 through 52.
*Am186™EM and Am188™EM Microcontrollers User's Manual,* Advanced Micro Devices, Inc., pp. i through viii, 9–1 through 9–13, and 11–1 through 11–8.
*Am186™ES and Am188™ES User's Manual,* Advanced Micro Devices, Inc., 1997, pp. i through ii, 9–1 through 9–14, and 10–1 through 10–14.
*Interfacing the Am188™EM Controller to the DSLAC™/QSLAC™Devices Using the SSI,* Advanced Micro Devices, Inc., Publication 21728, Rev. A, Amendment /0, May, 1997, pp. 1 through 6 and pp. A–1 through A–5.
*The I²C–bus and how to use it,* Phillips Semiconductors, pp. 46 through 83.

Primary Examiner—Thomas C. Lee
Assistant Examiner—Nguyen Quang Tanh
Attorney, Agent, or Firm—Akin, Gump, Strauss, Hauer & Feld, LLP

[57] ABSTRACT

In a microcontroller, a synchronous serial port is coupled to a DMA unit such that a series of DMA writes to the synchronous serial port can be followed by a series of DMA reads from the synchronous serial port, all without intervention or the execution of the microcontroller.

18 Claims, 6 Drawing Sheets

MICROCONTROLLER WITH A SYNCHRONOUS SERIAL INTERFACE AND A TWO-CHANNEL DMA UNIT CONFIGURED TOGETHER FOR PROVIDING DMA REQUESTS TO THE FIRST AND SECOND DMA CHANNEL

BACKGROUND OF THE INVENTION

1. Field of the Invention

The apparatus and method according to the invention pertains to microcontrollers, and more specifically, to a microcontroller providing a direct memory access unit that sends data to and stores data from a synchronous serial interface.

2. Description of the Related Art

Although consumers readily recognize the impact of personal computers in our society, they may be less aware of other manifestations of microcomputers within everyday life. Industrial and consumer products often require dedicated intelligence of their own, and to this end, the same technology that powers a personal computer has found its way into everyday industrial and consumer goods, such as cellular phones, televisions, stereo systems, and a wide variety of other products. Similarly, scientific instrumentation, communications systems, and control systems invariably include microcontrollers.

A centerpiece of this technology is known as a microcontroller, or embedded controller, which in effect is a microprocessor as used in a personal computer, but with a great deal of additional functionality combined onto the same monolithic semiconductor substrate (i.e., chip). In a typical personal computer, the microprocessor performs the basic computing functions, but other integrated circuits perform functions such as communicating over a network, controlling the computer memory, and providing input/output with the user.

In a typical microcontroller, many of these functions are embedded within the integrated circuit chip itself. A typical microcontroller, such as the Am186EM or AM186ES by Advanced Micro Devices, Inc., of Sunnyvale, Calif., not only includes a core microprocessor, but further includes a memory controller, a direct memory access (DMA) controller, an interrupt controller, and both asynchronous and synchronous serial interfaces. In computer systems, these devices are typically implemented as separate integrated circuits, requiring a larger area and increasing the size of the product. By embedding these functions within a single chip, size is dramatically reduced, often important in consumer products.

From a consumer products designer's viewpoint, often the particular combination of added features make a particular microcontroller attractive for a given application. Many microcontrollers are available that use the standard 80×86 microprocessor instructions, allowing for software to be easily developed for such microcontrollers. Because of the similar execution unit instruction sets, the added features often become principal differentiating criteria between particular microcontrollers.

Often, a synchronous serial communication port, or interface, is implemented in a microcontroller. A synchronous serial communication port allows the microcontroller to communicate with other devices or over data lines by sequentially sending and receiving bits of data, with that data being clocked by a clock signal also provided by the synchronous serial communication port. When two devices synchronously communicate, one generally acts as the master and the other the slave, with the master providing the serial clock. Other configurations are also possible, but a master/slave synchronous serial communications arrangement is often used in microcontroller or embedded controller applications for data communications. It is a simple configuration using few signal lines but allowing for very high speed data communication-much higher than asynchronous serial ports. This latter aspect is true because the transmitted lock synchronizes the two devices.

Synchronous serial communication ports are not only useful for high speed data communication over data communication lines, but are also useful for providing simple communications among devices within an embedded system. For example, even using microcontrollers a number of integrated circuits are often implemented in a single system, with a need for side band communications between those integrated circuits, such as for configuration, monitoring, and other purposes. To this end, a synchronous serial interface (SSI) bus was developed. This is a synchronous communication bus in which more than one device can act as master, driving the clock signal. But whatever synchronous protocol is chosen, in system level communication, a synchronous serial bus is a simple and effective technique for interdevice communication.

Therefore, it is often desirable in embedded systems in which a microcontroller is implemented to provide a synchronous serial port either for communications over data lines or among devices within the embedded system. For examples a microcontroller may be implemented controlling a number of communication chips, and desire to periodically obtain status from those chips. A synchronous serial communications port is a particularly suitable communication medium for doing so, requiring few chips, no independent synchronization of an asynchronous port, and high speed.

In implementing microcontrollers in embedded systems, another common requirement or desirable feature is the reduction of the bandwidth needed by any particular portion of the microcontroller in negotiating with other portions. For example, the core of a microcontroller is the execution unit, which is essentially a microprocessor core. It should be free to perform the programmed task to which it is dedicated, rather than spending time waiting on other units within the microcontroller. As described above, such units include I/O units, such as a parallel I/O, an asynchronous serial port, and a synchronous serial port, all of which are typically slow relative (long latency) to the execution unit.

Often helpful in freeing up the execution unit are direct memory access (DMA) units, timer control units, and interrupt control units. Such units off-load the tasks of waiting for certain external transactions to take place, and, in the case of the DMA unit, actually off-loading the task itself. The DMA unit can be programmed to perform transfers between memory locations, or between memory locations and an input/output port. Off-loading these tasks, the execution unit is freed from having to wait for such transfers to take place. Further, DMA does not require code or CPU overhead to perform reads and writes. This code and CPU overhead of non-DMA transactions reduces available system bandwidth.

DMA units have, in the past, been implemented in a microcontroller to provide direct memory access transfers between an asynchronous serial port and memory. The DMA unit is programmed with a starting point in memory and a destination asynchronous serial port (either memory or I/O mapped). The DMA unit repeatedly transfers data from memory to the asynchronous serial port, or vice versa, waiting for the asynchronous serial port to be ready for additional data before providing the next transfer. Such DMA frees the execution unit to continue performing whatever processing tasks it has been assigned.

Further improvements to a microcontroller by decoupling tasks among the various control units would be desirable.

SUMMARY OF THE INVENTION

According to the invention, a microcontroller is implemented with a synchronous serial port that is coupled to a DMA unit. The synchronous serial port and the DMA unit are configurable such that the DMA unit can perform a series of writes from memory to the synchronous serial port, followed by a series of reads from the synchronous serial port to memory by a second DMA channel.

Alternatively, the microcontroller execution unit can first execute a write to the serial port which, when complete, requests a DMA channel to perform a series of reads from the serial port.

Further embodiments provide for the interrupts to be masked or passed on completion of writes and reads. A timer control unit can be coupled to the synchronous serial port and the DMA unit to provide a delay before DMA reads and writes, to prevent overrunning an external device.

A bit is provided which allows for alternating DMA writes and reads, for example in a system where a data unit (i.e., a byte or word) is first written and then a data unit is read from the serial port successively to complete communications among a variety of devices.

The microcontroller execution unit can be partially or completely decoupled from the series of reads and writes. It may be desireable to have the execution unit create data to be sent, interpret data when received, or otherwise recognize a transfer should occur. According to the invention, the microcontroller execution unit can retain overall execution control, but without the execution burden of the transfer.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
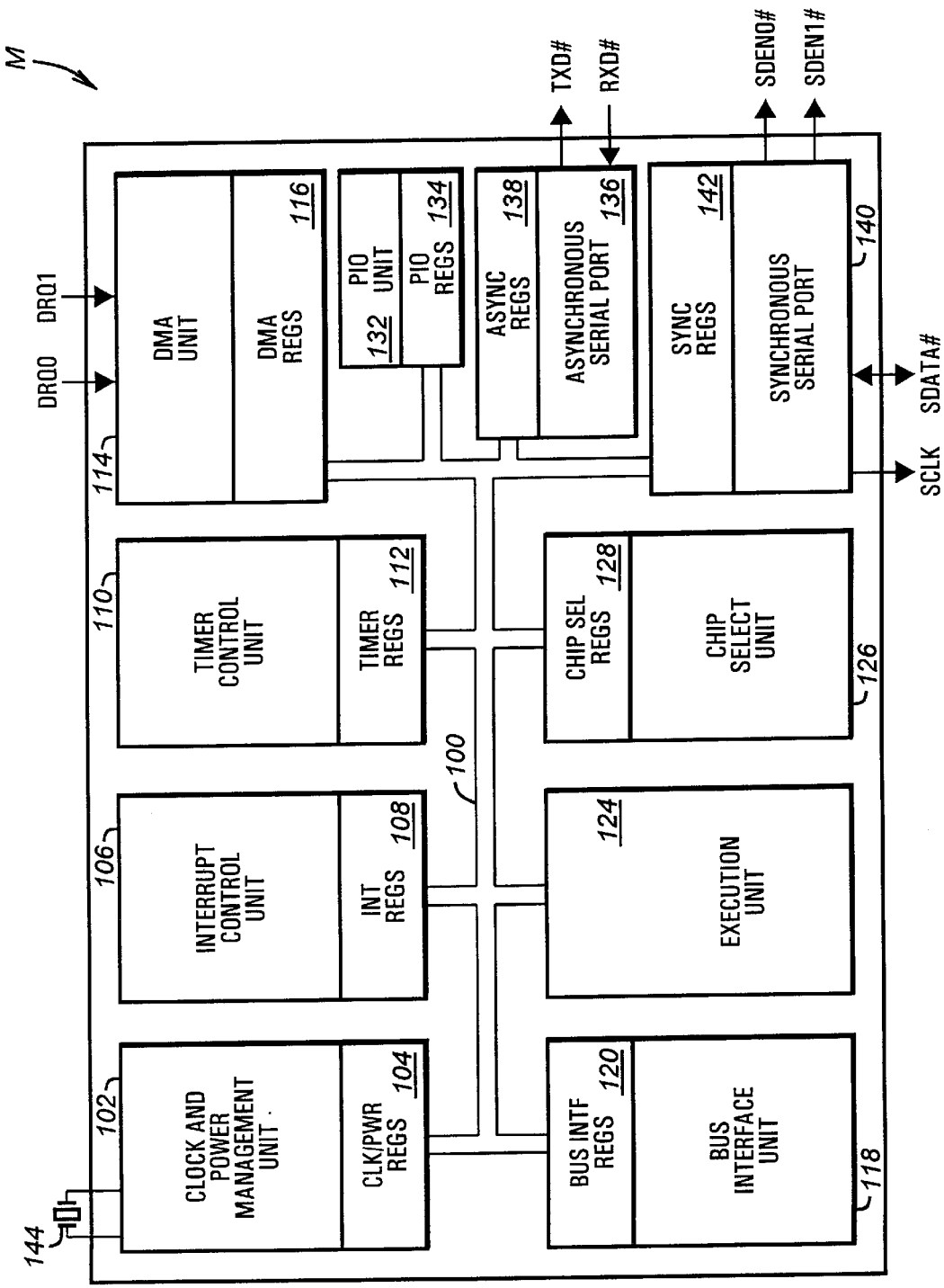
FIG. 1 is a block diagram of a typical microcontroller in which the techniques according to the invention can be implemented.

Turning to FIG. 1, shown is a block diagram of a typical microcontroller M implemented according to the invention. Such a microcontroller is preferably implemented on a single monolithic integrated circuit. The microcontroller M preferably includes an internal bus 100 coupling a variety of functional units and registers used to control and monitor those units. These include a clock and power management unit 102 with corresponding clock/power registers 104, an interrupt control unit 106 with corresponding interrupt registers 108, a timer control unit 110 with corresponding timer registers 112, a direct memory access (DMA) unit 114 with corresponding DMA registers 116, a bus interface unit 118 with corresponding bus interface registers 120, an execution unit 124 which is essentially a microprocessor core, a chip select unit 126 with corresponding chip select registers 128, a programmable input/output (PIO) unit 132 with corresponding PIO registers 134, an asynchronous serial port 136 with corresponding asynchronous register 138, and a synchronous serial port 140 with corresponding synchronous registers 142. Further, note the clock and power management unit 102 includes external pads connected to a crystal 144, which provides the timing not only for the execution unit 124, but also for generating the serial clock in the asynchronous serial port 136.

The block diagram of the microcontroller M is typical of microcontrollers, and could be for example, the Am186EM microcontroller by Advanced Micro Devices, Inc., of Sunnyvale, Calif. The techniques and circuitry according to the invention, however, could be applied to a wide variety of microcontrollers as well as other devices that use a non-ideal clock for generation of asynchronous serial port clocks. Further, the term "microcontroller" has differing definitions in industry. Some companies refer to a processor core with additional features (such as I/O) as a "microprocessor" if it has no onboard memory, and digital signal processors (DSPs) are now used for both special and general purpose controller functions. So as here used, the term "microcontroller" covers all of the products, and generally means an execution unit with added functionality all implemented on a single monolithic integrated circuit.

SYNCHRONOUS SERIAL PORT UNDER DMA CONTROL

Synchronous serial ports are generally known to the art. A typical synchronous serial port is found in the Am186EM microcontroller. When the synchronous serial port 140 is based on the synchronous serial port of that microcontroller, a 4-pin interface is provided, including two serial device enables SDEN0 and SDEN1, a serial clock SCLK output, which is derived from the processor internal clock divided by some multiple of 2, and serial data SDATA, which is provided by an active low pin SDATA#. Data is driven on the falling edge of SCLK and latched on the rising edge of SCLK.

Figure 2:
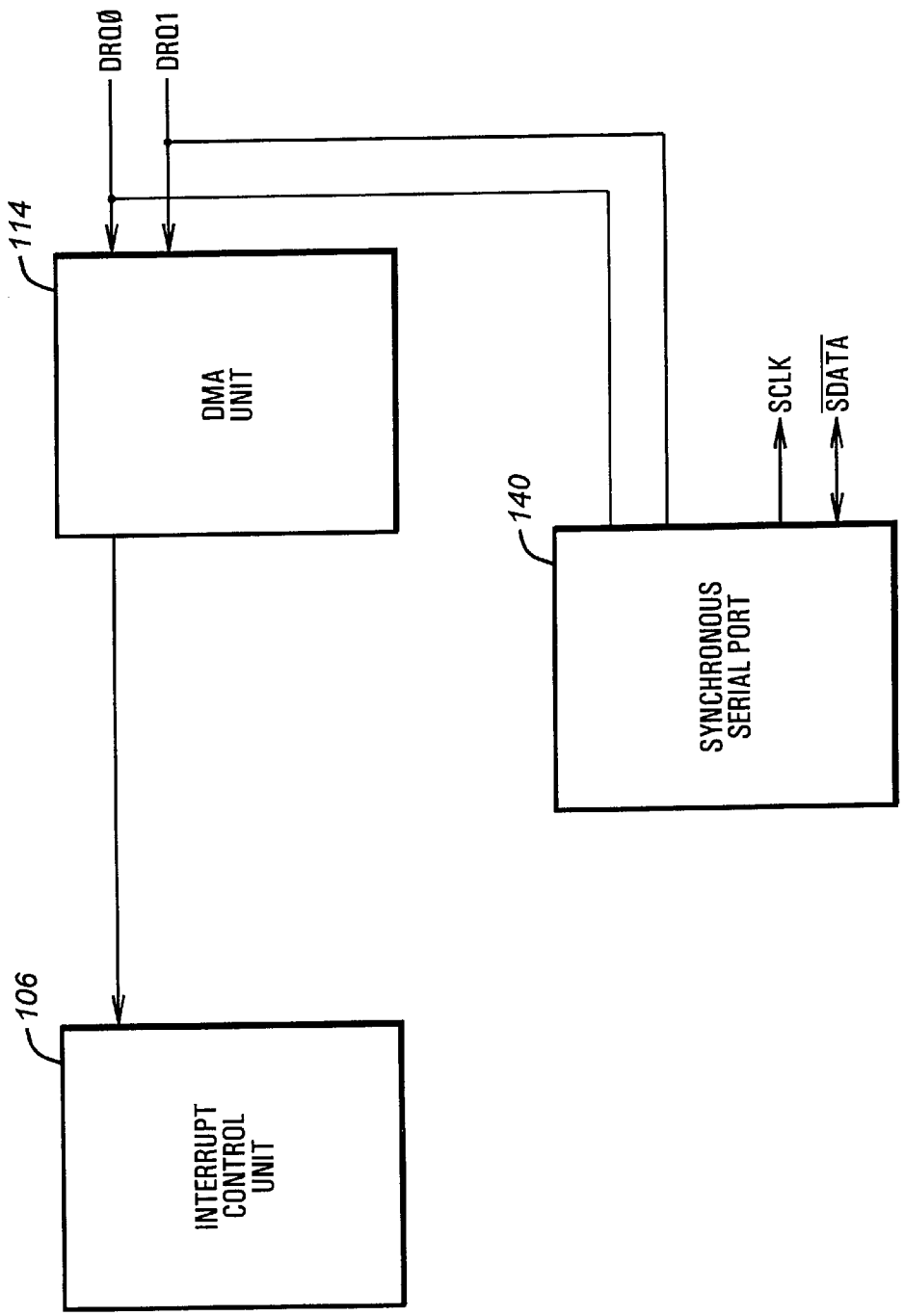
FIG. 2 is a block diagram illustrating further details of the interconnection of the DMA unit, interrupt control unit, and synchronous serial port of FIG. 1.

Turning to FIG. 2, a simplified block diagram of certain portions of the microcontroller M of FIG. 1 is shown. FIG. 2 illustrates how the synchronous serial port 140 is coupled to the DMA unit 114, providing the two DMA request signals DRQ0 and DRQ1 to the DMA unit 114.

According to the invention, the synchronous serial port 140 and the DMA unit 114 can together be configured to perform a series of writes from an external memory to the synchronous serial port 140 under the control of a first channel, channel 0 of the DMA unit 114. Upon completion of that sequence of writes, a bit within the synchronous registers 142 of the synchronous serial port 140 is checked to determined if a sequence of DMA reads should then be performed. If so, the synchronous serial port 140 then asserts DRQ1, causing a second channel of the DMA unit 114, DMA channel 1, to perform a series of DMA reads from the synchronous serial port 140 to memory.

Further, the interrupt control unit 106 receives an interrupt when the DMA unit 114 completes a predetermined number of writes or reads on a particular channel, assuming appropriate bits within the DMA registers 116 of the DMA unit 114 are set. The interrupt control unit 106 can in turn be programmed to mask or pass such interrupts, allowing the execution unit 124 to either ignore or respond to such interrupts.

SYNCHRONOUS SERIAL REGISTERS

Figure 3A:
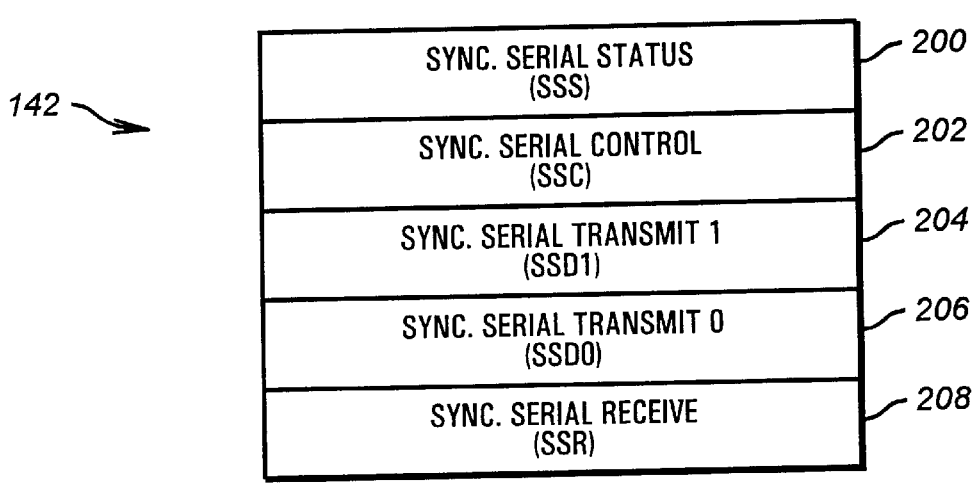
FIGS. 3A–3C are block diagrams illustrating the various synchronous serial registers used to control the synchronous serial ports, along with the meaning of particular bits within those registers.

Referring to FIG. 3A, the synchronous serial port 140 of the disclosed embodiment includes five registers as the synchronous registers 142. The first two are a synchronous serial status register (SSS) 200 and a synchronous serial control register (SSC) 202. The synchronous serial status register 200 includes standard bits used in synchronous serial status ports, such as a receive/transmit error detect bit, and a data receive/transmit complete bit. The synchronous serial status register 200 also includes an overrun bit (OVR) 210 and a port busy bit (PB) 212, discussed below in conjunction with FIG. 3B. The synchronous serial status register 200 can be read by the execution unit 124 as a memory mapped register, providing the status of synchronous serial port 140.

The synchronous serial control register 202 allows the execution unit 124, through this memory mapped register, to control the synchronous serial port 140. A number of bits and values contained in this register 202 are discussed below in conjunction with FIG. 3C, including an alternate DMA channels bit (ALT) 214, a serial DMA channel 1 enable bit (SDMA1) 216, a serial DMA channel 0 enable register (SDMA0) 218, a serial device enable bit 1 (DE1) 220, and a serial device enable bit 0 (DE0) 222. In addition to these particular bits, in the disclosed embodiment, the synchronous serial control register 202 includes a serial clock divisor field SCLKDIV, which determines the SCLK frequency as derived from an internal processor clock of the clock and power management unit 102.

A synchronous serial transmit 1 register (SSD1) 204 and synchronous serial transmit 0 register (SSD0) 206, when written to, provide data for transmission via the synchronous serial port 140. There are two registers, but in the disclosed embodiment each of these cause a write to the same serial data line SDATA using the same serial clock SCLK. Finally, a synchronous serial receive register (SSR) 208 contains the receive data transmitted by an external device over the SCLK and SDATA lines. When that data is received, a data receive bit within the synchronous serial status register 200 becomes true.

Figure 3B:
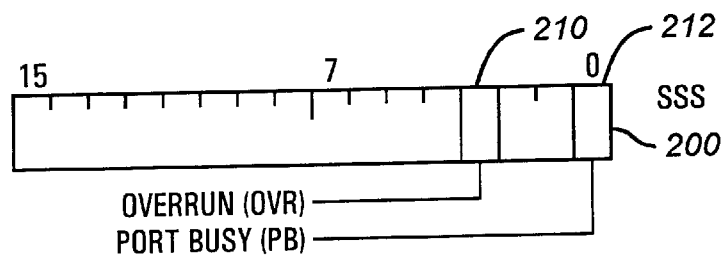
Figure 3C:
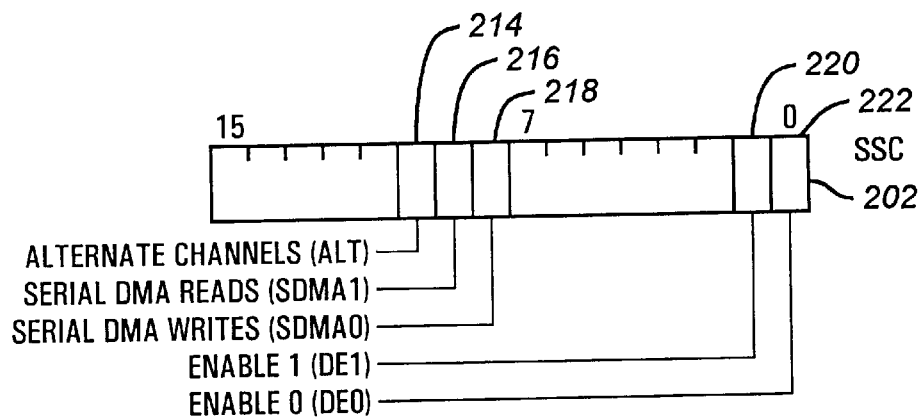

Turning to FIGS. 3B and 3C, shown are further details of the synchronous serial status register 200 and the synchronous serial control register 202. Specifically, certain bits are shown which are of particular relevance to a synchronous serial port 140 implemented according to the invention. The port busy bit (PB) 212 is true whenever a transmit or receive operation is in progress. When the port busy bit PB 212 is false, or reset, the port 140 is ready to transmit or receive data.

The overrun bit (OVR) 210 is provided for the event in which the synchronous serial port 140 receives multiple data items from an external device before the DMA unit 114 is able to read the synchronous serial receive register (SSR) 208. Although this is an unlikely event, the OVR bit 210 would be set in such an event.

FIG. 3C illustrates certain bits pertinent for coupling the synchronous serial port 140 to the DMA unit 114 according to the invention. As is discussed below, the DMA unit 114 in the disclosed embodiment includes two channels, one of which is used for reading and the other which is used for writing in conjunction with the synchronous serial port 140. The SSC.ALT bit 214, when set, provides that after a DMA write using one channel from memory to the synchronous serial port 140, the other DMA channel performs a read from the synchronous serial port 140 to memory. This continues until a terminal count within the DMA unit 114, again discussed below, indicates a completion of the DMA transfers.

The serial DMA channel 0, or writes, bit (SDMA0) 218 indicates, when set, that when the SSS.PB bit 212 becomes false, indicating the synchronous serial port 140 is not busy, the DMA request signal DRQ0 should be asserted, causing the DMA unit 114 to perform a series of DMA writes to one of the synchronous serial transmit registers (SSDn) 204 or 206 the synchronous serial port 140 using its channel 1. This is repeated until the DMA unit 114 transfers the number of data items programmed, or until the DMA channel otherwise determines that the transfer is complete. At that time, if the serial DMA channel 0, or reads, bit (SDMA1) 216 is true, DRQ1 is asserted causing the second DMA channel to then perform a series of DMA reads from the synchronous serial receive register (SSR) 208 of the synchronous serial port 140.

The enable 1 bit (DE1) 220 and the enable 0 bit (DE0) 222 cause the external SDEN0# and SDEN1# pins to be asserted or deasserted correspondingly. This allows for the enablement or disablement of external devices. Further, however, when both the SSC.DE1 bit 220 and the SSC.DE0 bit 222 are false, a read from the synchronous serial receive register (SSR) 208 will not institute a series clock pulses over SCLK for a serial read. Generally, to initiate a data read over the SDATA line, the execution unit 124 performs a read of the synchronous serial receive register (SSR) 208, which causes a sequence of clock pulses on SCLK, allowing an external slave device to provide the data. By disabling the SSC.DE1 bit 220 and the SSC.DE0 bit 222, however, a final received data item can be read from the synchronous serial receive register 208 without causing another read sequence over the synchronous serial port 140.

Thus, according to the invention, a standard synchronous serial port 140 is provided with control bits that couple the synchronous serial port 140 to the DMA unit 114. In the disclosed embodiment, these bits cause the DMA request signal DRQ0 and DRQ1 to be asserted at appropriate times to provide for synchronous serial transfers using first a DMA write channel and then a DMA read channel.

DMA AND INTERRUPT REGISTERS

Figure 4A:
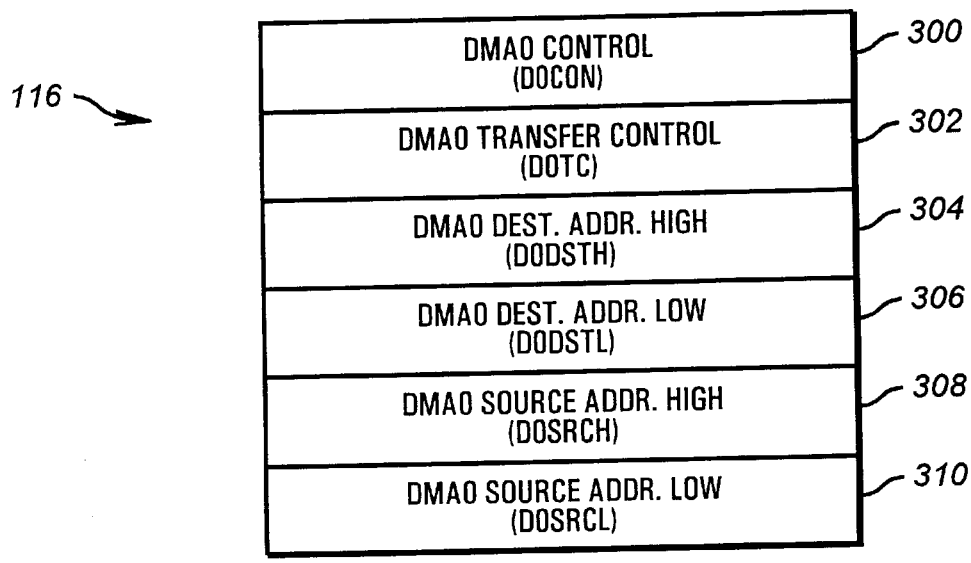
FIGS. 4A and 4B are a block diagram illustrating various DMA registers, along with the meaning of particular bits within those registers.
Figure 4B:
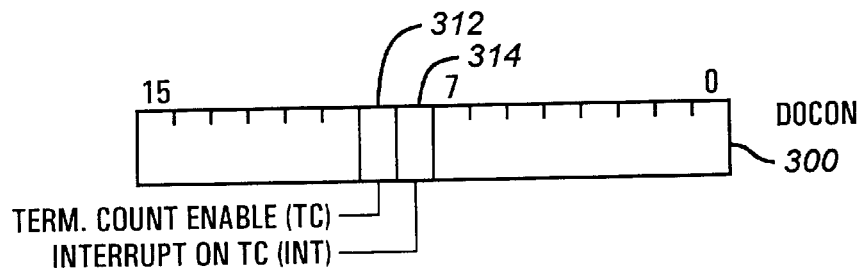

Turning to FIGS. 4A and 4B, shown are a portion of the registers within the DMA registers 116, as well as details of particular bits within one of those registers. The DMA registers 116 in the disclosed embodiment include DMA channel 0 control register (D0CON) 300, a DMA0 transfer count register (D0TC) 302, a DMA0 destination address high register (D0DSTH) 304 and a DMA0 destination address low register (D0DSTL) 306 which together specify a DMA0 destination address (D0DST), and a DMA source address high register (D0SRCH) 308 and a DMA0 source address low register (D0SRCL) 310 which together specify a DMA0 source address (D0SRC). These are standard DMA registers, which are repeated (although not shown) for the second channel, DMA1. The DMA0 control register (D0CON) 300 includes a variety of bits controlling transfers using DMA channel 0. These include a destination address space bit for selecting between memory and I/O space; a destination decrement bit that causes the destination address (D0DST) 304 to decrement after each transfer; a destination increment bit which causes the destination address (D0DST) to instead increment after each transfer; a source address space select bit which selects memory or I/O space; a source decrement and source increment bits which cause the source address (D0SRC) to decrement or increment after each transfer; a synchronization type field for specifying source synchronization, destination synchronization, or unsynchronized transfers; a priority bit; a timer enable/disable request bit which enables DMA requests from a timer in the timer control unit 110; a start/stop DMA channel0 bit; a change start bit; and a byte/word select which selects whether byte or word transfers will occur. All of these are well-known fields which are further described, for example, in the Am186EM User's Manual.

Two other bits are of particular interest in the DMA control register (D0CON) 300. These are shown in FIG. 4B, and include a terminal count enable bit TC bit 312 and an interrupt on TC bit (INT) 314. The D0CON.TC bit 312, when set, causes DMA channel 0 to terminate DMA when the transfer count register (D0TC) 302 reaches zero. The transfer count register (D0TC) 302 is decremented after each transfer, so if the transfer count register (D0TC) 302 is loaded with the desired number of data items to transfer before DMA is initiated, that number of items will be transferred and then the DMA will be terminated. This is of particular interest when using DMA with the synchronous serial port 140, and (for example) DMA channel 0 is employed for a DMA write, and then the DMA channel 1 is employed for a read. If the transfer count register (D0TC) 302 is first set with the number of bytes to write, DMA channel 0 will terminate after those writes, resetting the serial DMA writes bit (SDMA0) 218, at which point DMA channel 1 will begin a read if the serial DMA reads bit (SDMA1) 216 is set.

While in the previous discussion it has been assumed that channel 0 will be employed for DMA writes to the synchronous serial port 140, and channel 1 will be employed for DMA reads from the synchronous serial port 140, this is more a matter of configuration rather than a system requirement. Each DMA channel can be configured for memory or I/O space source and destination addresses, and can be configured to increment, decrement, or keep the source or destination address the same. To configure channel 0 for a DMA write to the serial port, for example, the DMA0 source address (D0SRC) is loaded with the source address in memory, the DMA0 destination address (D0DST) is loaded with either the memory mapped address of one of the synchronous serial transmit registers (SSD) 204 or 206, and the DMA0 control register (D0CON) 300 is configured for the source address to be in memory space, the destination address to be in memory space, to increment the source address after each read from the source, to hold the destination address (i.e., the synchronous serial transmit register (SSD) 204 or 206) constant, and to synchronize with the destination. DMA channel 1 is similarly configured, but for reads from the synchronous serial receive register (SSR) 208. As will be appreciated, either channel can be configured for reads or writes via the synchronous serial port 140.

The interrupt on TC bit (INT) 314, when set, causes DMA channel 0 to generate an interrupt on completion of the transfer count held in the DMA transfer count register (D0TC) 302. This is useful to provide for execution unit 124 monitoring of reads after a DMA write is complete, or otherwise to inform the execution unit 124 that either a synchronous serial write DMA or synchronous serial read DMA has completed.

Therefore, prior to performing a DMA to the synchronous serial port 140, DMA channel 0 is configured with an appropriate transfer count within the transfer count register (D0TC) 302, with an appropriate source address within the source address registers (D0SRC) 308 and 310, and with one of the synchronous serial transmit registers (SSD) 204 or 206 as the destination address (D0DST). DMA channel 0 will then perform a DMA write to the synchronous serial port 140. Similarly, DMA channel 1 is set up with a transfer count within the transfer count register (D1TC), the destination address for the reads from the synchronous serial port 140 set within the DMA1 destination address registers (D1DST), and the source address (D1SRC) set to the synchronous serial receive register (SSR) 208.

Figure 5:
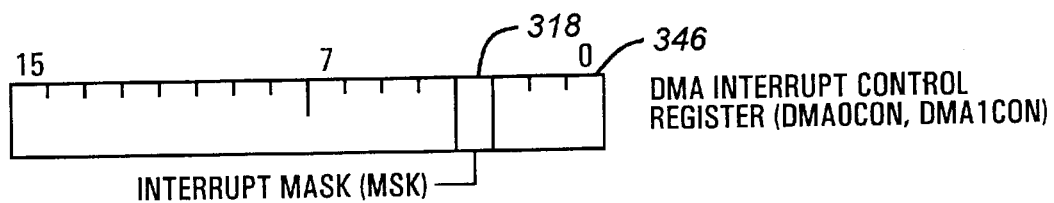
FIG. 5 is a diagram illustrating the meaning of a particular bit within an interrupt control register.

Turning to FIG. 5, shown is an interrupt mask register within the interrupt control unit 106. Specifically, shown is a DMA interrupt control register 316, which is actually repeated for each DMA channel as DMA0CON and DMA1CON. Of principal interest is an interrupt mask bit MSK 318, which, when true, masks any interrupts provided by the corresponding DMA channel. Of note, the corresponding DMA channel will only issue an interrupt if the corresponding DnCON.INT bit 314 is set. Even if that bit is set, if the interrupt mask bit MSK 318 is true, no actual interrupt will occur to the execution unit 124 even if the terminal count bit (TC) 312 is true.

OPERATION OF SYNCHRONOUS SERIAL PORT DMA READS AND WRITES

Figure 6:
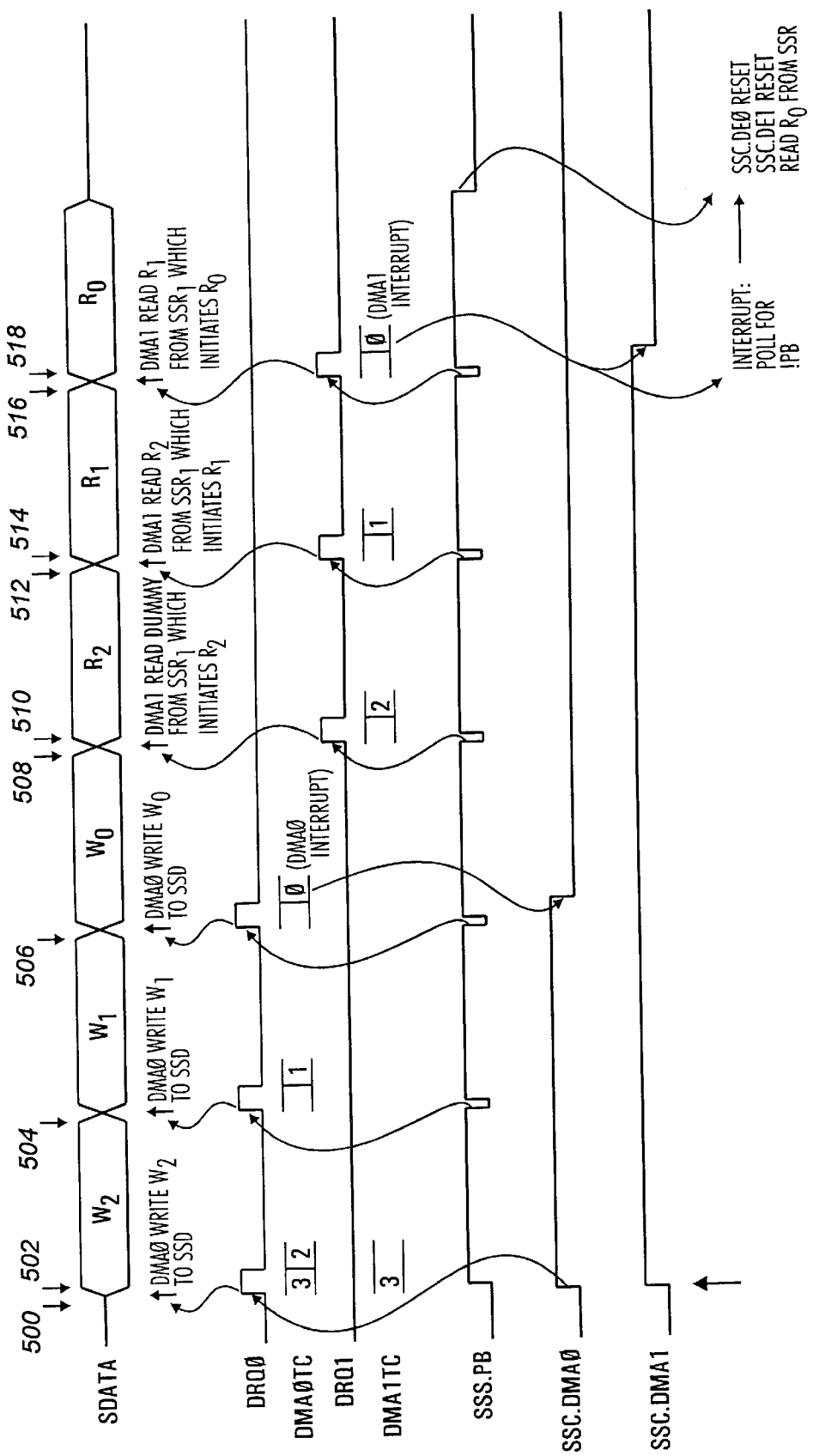
FIG. 6 is a timing diagram illustrating a synchronous serial write DMA followed by synchronous serial read DMA according to the invention.
Figure 7:
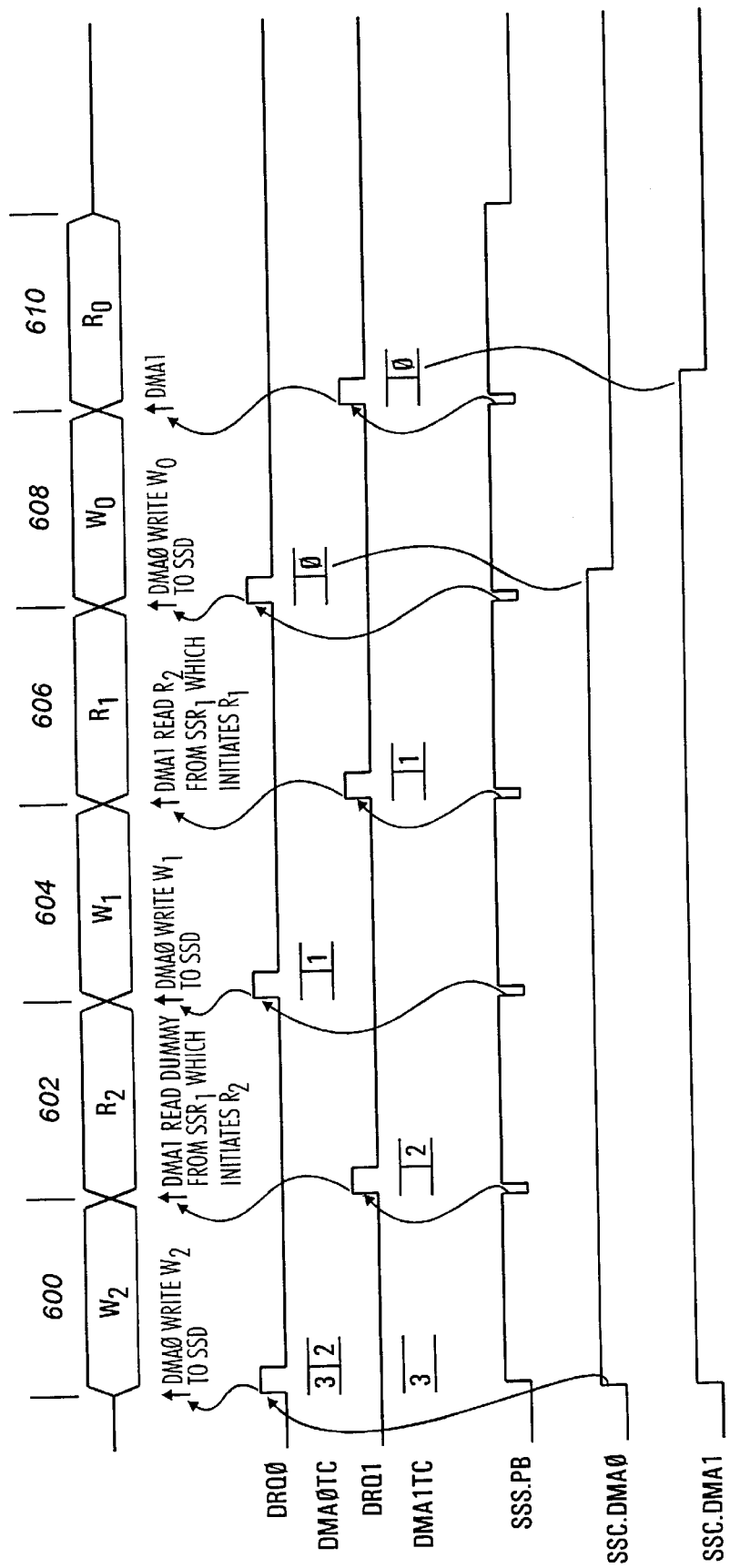
FIG. 7 is a timing diagram illustrating alternating synchronous serial writes and reads according to the invention.

Given the preceding discussion of the registers and bits of the DMA unit 114, the synchronous serial port 140, and the interrupt control unit 106, timing diagrams of FIGS. 6 and 7 illustrate programming and operation of the synchronous serial DMA according to the invention.

Turning to FIG. 6, shown is a basic timing diagram of a programmed sequence of three DMA writes to the synchronous serial port 140 followed by three DMA reads. The three DMA writes are of three data items, $W_2$ through $W_0$. The reads are of three data items, $R_2$ through $R_0$. In the sequence shown in FIG. 6, channel 0 of the DMA unit 114 is programmed to execute the three writes, at which point the transfer count in the D0TC register 302 reaches 0, resetting the SSC.SDMA0 bit 218. Then, the SSC.SDMA1 bit 216 causes DMA channel 1 to be invoked by a request via DRQ1. This causes three reads to be executed by DMA channel 1. Although the final read over the serial port is executed by the DMA unit 114, the execution unit 124 will then receive an interrupt and actually read the final data item from the SSR register 208.

Prior to execution of the sequence of writes followed by the sequence of reads, a number of the previously discussed registers are set with appropriate values. Referring to FIG. 4A, the DMA0 transfer count register (D0TC) 302 is set to 3, indicating three writes will be executed. Further, the terminal count enable bit (TC) 312 of the DMA control register 300 is set to cause channel 0 to terminate DMA when the D0TC register 302 reaches zero. For channel 1, the terminal count is set to 3 by loading the D1TC register with 3, and similarly the terminal count bit is set by setting D1CON.TC.

Turning to the synchronous serial control register 202, both serial DMA channels are set to be invoked via DRQ0 and DRQ1 by setting the SSC.SDMA0 bit 218 and the SSC.SDMA1 bit 216. Further, a field within the DMA channel 0 control register 300 and the DMA channel 1 control register is set for appropriate synchronization. Specifically, DMA channel 0, which will perform the writes, is set to destination synchronization. This means a subsequent write will not occur until the DRQ0 signal is asserted by the synchronous serial port 140. This occurs when the destination (here, one of the synchronous serial transmit registers (SSD) 204 or 206) can be loaded with the data. This is true when the port busy bit PB 212 of the synchronous serial status register 200 becomes false. Similarly, the synchronization field within the channel 1 DMA control register D 1 CON is set for source synchronization. This is appropriate because on reads, a DMA should not occur until the source has data available—in this case, data ready in the synchronous serial port 140 SSR register 208.

In both the D0CON register 300 and the corresponding D1CON register, the interrupt on TC bit INT 314 is set, so that an interrupt occurs when the particular channel's transfer is complete. This is for two reasons. First, preferably the interrupt signal from a DMA channel is used to reset the corresponding SSC.SDMA0 bit 218 or SSC.SDMA1 bit 216. Further, however, when DMA channel 1 completes its reads, the DMA channel will cause an interrupt to the processor so that the processor knows that the sequence reads is complete and the final data item, $R_0$ can be read.

This latter aspect is controlled by setting the DMA0CON.MSK bit 318 so that the execution unit 124 is not interrupted at the end of the series of writes, but resetting the DMA1CON.MSK bit, so that at the end of the series of DMA reads, the execution unit 124 is interrupted by channel 1 of the DMA unit 114.

Alternatively, the DMA0CON.MSK bit 318 can be reset so that the execution unit 124 is interrupted at the end of the sequence of writes. This can be done if it is desired for the execution unit 124 to at least monitor the sequence of DMA reads that is then executed by channel 1.

Further, various of the other synchronous serial registers 142 and their bits and the DMA registers 116 and their bits are set so that channel 0 of the DMA unit 114 uses memory mapped source and destination, sets the source to a location in memory containing the data to be sent, sets the destination to the memory map location of the desired synchronous serial transmit register (SSD) 204 or 206, and selects appropriate byte or word wide transfers. Similarly, for channel 1, the source and destination are set to be memory mapped, with the source being the memory mapped location of the synchronous serial receive register (SSR) 208, and the destination being the appropriate memory location to store the received data. The destination address is set to increment, while the source address (being the serial receive register) is set constant.

All of these various settings are summarized by the table below:

| Register/Bit | Purpose |
| --- | --- |
| D0TC register 302 = 3 | Three byte transfer on channel 0 |
| D0CON.TC bit 312 set | Stop channel 0 on D0TC == 0 |
| D1TC register = 3 | Three byte transfer on channel 1 |
| D1CON.TC bit set | Stop channel 1 on D1TC == 0 |
| SSC.SDMA0 bit 218 set | Channel 0 requests enabled |
| SSC.SDMA1 bit 216 set | Channel 1 requests enabled |

-continued

| Register/Bit | Purpose |
| --- | --- |
| D0CON.INT bit 314 set | Interrupt on D0TC == 0 (resets SSC.SDMA0) |
| D1CON.INT bit set | Interrupt on D1TC == 0 (resets SSC.SDMA1) |
| DMA0CON.MSK bit 318 set (reset for execution unit attended reads) | Masks actual CPU interrupt on D0TC == 0 |
| DMA1CON.MSK reset | Allow CPU interrupt on D1TC == 0 |
| Other D0CON register 300 settings: | |
| Source and destinations set to memory | Use memory and memory mapped registers |
| Source set to increment or decrement | Move through memory to obtain write data |
| Destination set to remain fixed | Memory mapped SSD register |
| Byte select | For byte wide transfers |
| Synchronization set to destination | Allow the synchronous serial port 140 to drive the DMA |
| D0SRC registers 308 and 310 set to appropriate memory location | Source data |
| D0DST registers 304 and 306 set to memory mapped location of synchronous serial transmit register (SSR) 204 or 206 | Destination is synchronous serial transmit register |
| Other D1CON register settings: | |
| Source and destinations set to memory | Use memory and memory mapped registers |
| Source set to remain fixed | Memory mapped SSR register |
| Destination set to increment or decrement | Write received data to memory |
| Byte select | For byte wide transfers |
| Synchronization set to source | Allow the synchronous serial port 140 to drive the DMA |
| D1DST registers set to appropriate memory | Destination data |
| D1SRC registers set to memory mapped location of synchronous serial receive register (SSR) 208 | Source is synchronous serial transmit register |

Referring to the diagram of FIG. 6, in view of these initial settings, at a first point in time 500 the SSC.SDMA0 bit 218 and the SSC.SDMA1 bit 216 have been set true. At this point, the SSS.PB bit 212 is false, indicating the synchronous serial port 140 is not executing a serial read or write. Upon the setting of the SSC.SDMA0 bit 216, the synchronous serial port 140 asserts DRQ0 in response. DRQ0 is asserted by the synchronous serial port 140 when the SSC.SDMA0 bit 216 is true and the SSS.PB bit 212 is false. When DRQ0 is asserted, the DMA unit 114 channel 0 executes a DMA write the data at the DMA source address (D0SRC) to one of the synchronous serial transmit registers (SSD) 204 or 206.

Further at point in time 500, the DMA0TC register 302, and the corresponding DMA1TC register for channel 1, both are loaded with a count of 3. The DMA0TC register 302, however, is decremented at a point in time 502, which is the time when channel 0 of the DMA unit 114 has completed the write to the SSD register 204 or 206. At this point, the synchronous serial port 140 proceeds to write the data $W_2$ over the SDATA# line and the SCLK line, transmitting the data to whatever device is receiving that data. Even after the write has completed to the SSD register 204 or 206, however, the SSS.PB bit 212 remains high, indicating the synchronous serial port 140 is busy. Because channel 0 has been destination synchronized, it will not initiate another write to the synchronous serial port 140 until DRQ0 is again asserted by the synchronous serial port 140.

At a point in time 504, the write of the data $W_2$ is complete, so the SSS.PB bit 212 falls low, indicating that the synchronous serial port 140 is no longer busy. Because the SSC.SDMA0 bit 218 is still true, this in turn causes the synchronous serial port 140 to again assert the DRQ0 signal, in turn causing a DMA write by channel 0 to the SSD register 204 or 206. In this case, the data $W_1$ is written. This sequence is repeated at point in time 506, when SSS.PB bit 212 again goes low, and the DRQ0 signal is again asserted. This, however, is the write of the final data item to the SSD register 204 or 206, so the transfer count register DMA0TC goes to 0, which in turn causes the DMA unit 114 to issue an interrupt because the D0CON.TC bit 312 is set and the D0CON.INT bit 314 is set. Note, however, this interrupt does not cause an actual interrupt to the execution unit 124 because the DMA0CON.MSK bit 316 is also set. It does, however, cause the channel 0 interrupt signal to be applied to the synchronous serial port 140, in response to which the synchronous serial port 140 resets the SSC.SDMA0 bit 218. So, at point 508 at the end of the write of the data $W_0$, the SSS.PB bit 212 again goes low, but at this point, the SSC.SDMA0 bit 218 is no longer true. So another DRQ0 will not be issued.

The SSC.SDMA1 bit 216, however, is true, indicating the DMA unit 114 should proceed with the DMA read using channel 1. The DRQ1 signal is asserted by the synchronous serial port 140, which in turn causes a DMA read by channel 1 of the DMA unit 114 from the synchronous serial receive register (SSR) 208. This read initiates a read of the data $R_2$, but because of the particular implementation of the microcontroller M, the data read by the DMA unit 114 and stored in memory is invalid data, because the data $R_2$ has not yet been received. Instead, the read by DMA channel 1 from the register (SSR) 208 at a point 510 is a dummy read that initiates the read of $R_2$. At the end of that dummy read, the D1TC register is decremented to 2, and DMA channel 1 goes idle, waiting for the source (i.e., the synchronous serial port 140) to issue another DRQ1.

This DRQ1 occurs when the SSS.PB bit 212 goes low at point 512. At this point the data $R_2$ has been read by the synchronous serial port 140 from the SDATA# line and stored in the SSR register 208. When the SSS.PB bit 212 goes low, the DRQ1 signal is asserted, which in turn causes channel 1 of the DMA unit 114 to read the register (SSR) 208. That read not only reads the data $R_2$ from the synchronous serial receive register (SSR) 208 and stores that data in channel 1 destination memory, but also initiates the read of $R_1$ at point in time 514. After the data is read from the SSR register 208, the D1TC register is again decremented, and the DMA channel 1 waits for the next data to be available from the synchronous serial port 140. This occurs at point 516, where DMA channel 1 reads the data $R_1$ which has just been received into the synchronous serial register SSR 208 and initiates the read of $R_0$, starting at 518. The TC is then decremented to zero. This causes not only an interrupt to the synchronous serial port 140, resetting the SSC.SDMA1 bit 216, but also initiates an actual interrupt to the execution unit 124. In this case, the execution unit 124 then polls the port busy bit (PB) 212 until it goes false, at which point a routine within the execution unit 124 resets the two enable bits SSC.DE0 222 and SSC.DE1 220, and then reads the data $R_0$ from the SSR register 208.

Thus, using two DMA channels, a sequence of writes followed by a sequence of reads is executed to and then from the synchronous serial port 140 without execution unit 124 intervention.

Turning to FIG. 7, shown is a similar time line to that of FIG. 6, but in this case, it is also assumed that the alternate channels bit SSC.ALT 214 is set. This bit causes one change from the timing of FIG. 6—specifically, as long as both of the serial DMA bits SSC.SDMA0 218 and SSC.SDMA1 216 are set, the synchronous serial port 140 alternates asserting DRQ0 and DRQ1. In this way, DMA channel 0 first writes data $W_2$ during a time period 600, and then DMA1 initiates a dummy read, which causes a read of data $R_2$ in a period 602. This proceeds with alternating writes and reads of data $W_1$, $R_1$, $W_0$, and $R_0$ in subsequent periods 604, 606, 608, and 610. Again, after the penultimate read of $R_0$, an interrupt to the execution unit 124 allows the execution unit 124 to poll for the port busy bit SSS.PB 212 to go low, at which point the final data $R_0$ can be read from the SSR register 208.

It will be appreciated that by setting the bits appropriately within the various control registers, a series of DMA reads can be executed after a processor initiated write, or instead a series of DMA writes can be followed by a series of processor executed reads. Given the control registers of FIGS. 3A–5, for example, the following would be appropriate settings for registers for a series of DMA reads after a processor initiated write. Preferably, the various registers would be set to their values immediately after a processor write was initiated. After that processor write was completed, a series of reads would be executed by DMA channel 0.

| Register/Bit | Purpose |
|---|---|
| D0TC register 302 = 3 | Three byte transfer on channel 0 |
| D0CON.TC bit set | Stop channel 0 on D1TC == 0 |
| SSC.SDMA0 bit 218 set | Channel 0 requests enabled |
| SSC.SDMA1 bit 216 reset | Channel 1 requests disabled |
| D0CON.INT bit 314 set | Interrupt on D0TC == 0 (resets SSC.SDMA0) |
| DMA0CON.MSK bit 318 reset | Allow CPU interrupt on D0TC == 0 |
| Other D0CON register 300 settings: | |
| Source and destinations set to memory | Use memory and memory mapped registers |
| Source set to remain fixed | Memory mapped SSR register |
| Destination set to increment or decrement | Write received data to memory |
| Byte select | For byte wide transfers |
| Synchronization set to source | Allow the synchronous serial port 140 to drive the DMA |
| D0DST registers 308 and 310 set to appropriate memory | Destination data |
| D0SRC registers 304 and 306 set to memory mapped location of synchronous serial receive register (SSR) 208 | Source is synchronous serial transmit register |

Similarly, the following are appropriate settings for a series of DMA writes by channel 0 followed by an interrupt to the processor so that the processor can execute a series of polled reads:

| Register/Bit | Purpose |
|---|---|
| D0TC register 302 = 3 | Three byte transfer on channel 0 |
| D0CON.TC bit 312 set | Stop channel 0 on D0TC == 0 |
| SSC.SDMA0 bit 218 set | Channel 0 requests enabled |
| SSC.SDMA1 bit 216 reset | Channel 1 requests disabled |
| D0CON.INT bit 314 set | Interrupt on D0TC == 0 (resets SSC.SDMA0) |
| DMA0CON.MSK bit 318 reset | Allow CPU interrupt on D0TC == 0 |

-continued

| Register/Bit | Purpose |
| --- | --- |
| Other D0CON register 300 settings: | |
| Source and destinations set to memory | Use memory and memory mapped registers |
| Source set to increment or decrement | Move through memory to obtain write data |
| Destination set to remain fixed | Memory mapped SSD register |
| Byte select | For byte wide transfers |
| Synchronization set to destination | Allow the synchronous serial port 140 to drive the DMA |
| D0SRC registers 308 and 310 set to appropriate memory location | Source data |
| D0DST registers 304 and 306 set to memory mapped location of synchronous serial transmit register (SSR) 204 or 206 | Destination is synchronous serial transmit register |

USE OF INTERVENING TIMER

Further, it will be understood that in many situations, the devices to which data is written to and read from may have different timing characteristics in the microcontroller M. It may be desirable to institute a delay either between writes or reads between the sequence of writes followed by the sequence of reads, or between each write and read. This can be done by providing further circuitry to start a timer from the synchronous serial port 140. The timer then initiates the DMA request. That is, rather than the port busy bit SSS.PB 212 when low initiating a DRQ0 or DRQ1, it would start a timer within the timer control unit 110, which would in turn initiate the corresponding DRQ0 or DRQ1. One skilled in the art will readily appreciate this extension to the architecture illustrated in FIGS. 1–7.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A microcontroller implemented as a single monolithic integrated circuit, comprising:
   an execution unit;
   a direct memory access (DMA) unit with at least a first DMA channel and a second DMA channel configurable by the execution unit; and
   a synchronous serial port with a transmit register and a receive register and coupled to the DMA unit for providing DMA requests to the first DMA channel and the second DMA channel, wherein the DMA unit and the synchronous serial port are together configurable by the execution unit such that the DMA unit executes a series of writes to the transmit register of the synchronous serial port followed by a series of reads from the receive register of the synchronous serial port without execution unit intervention.

2. The microcontroller of claim 1, wherein the series of writes is executed using the first DMA channel, and wherein the series of reads is executed using the second DMA channel.

3. The microcontroller of claim 1, wherein the synchronous serial port includes a control register accessible by the execution unit, the control register including a bit enabling DMA requests to the first DMA channel and including a bit enabling DMA requests to the second DMA channel.

4. The microcontroller of claim 3, wherein the control register includes an alternate channels bit, which causes the synchronous serial port to alternate DMA requests between the first DMA channel and the second DMA channel.

5. The microcontroller of claim 1, wherein the synchronous serial port is configurable as a master.

6. The microcontroller of claim 1, wherein the DMA unit is configurable to interrupt the execution unit at the end of the series of reads.

7. The microcontroller of claim 1, wherein the DMA unit is configurable to interrupt the execution unit following the series of writes so that the execution unit can monitor the series of reads.

8. The microcontroller of claim 1, further comprising a timer coupled to the synchronous serial port, the timer starting responsive to the completion of a transfer responsive to a first DMA request, and the timer initiating a second DMA request causing a second transfer by the synchronous serial port responsive to timing out.

9. A microcontroller implemented as a single monolithic integrated circuit, comprising:
   an execution unit;
   a direct memory access (DMA) unit with at least a first DMA channel configurable by the execution unit; and
   a synchronous serial port with a transmit register and a receive register and coupled to the DMA unit for providing DMA requests to the first DMA channel, wherein the DMA unit and the synchronous serial port are together configurable by the execution unit such that the DMA unit executes a series of reads from the receive register of the synchronous serial port immediately following a write by the execution unit to the transmit register of the synchronous serial port.

10. The microcontroller of claim 9, further comprising a timer coupled to the synchronous serial port, the timer starting responsive to the completion of a transfer responsive to a first DMA request, and the timer initiating a second DMA request causing a second transfer by the synchronous serial port responsive to timing out.

11. A microcontroller implemented as a single monolithic integrated circuit, comprising:
   an execution unit;
   a direct memory access (DMA) unit with at least a first DMA channel and a second DMA channel configurable by the execution unit; and
   a synchronous serial port with a transmit register and a receive register and coupled to the DMA unit for providing DMA requests to the first DMA channel and the second DMA channel, wherein the DMA unit and the synchronous serial port are together configurable by the execution unit such that the synchronous serial port alternatively requests DMA via the first DMA channel and then the second DMA channel, such that the DMA unit executes an alternating series of writes and reads to the transmit register and the receive register of the synchronous serial port without execution unit intervention.

12. The microcontroller of claim 11, wherein the synchronous serial port includes a control register accessible by the execution unit, the control register including a bit enabling DMA requests to the first DMA channel and including a bit enabling DMA requests to the second DMA channel.

13. The microcontroller of claim 11, wherein the synchronous serial port includes a control register accessible by the execution unit, the control register including a bit enabling alternating requests to the first DMA channel and the second DMA channel.

14. The microcontroller of claim 11, further comprising a timer coupled to the synchronous serial port, the timer starting responsive to the completion of a transfer responsive to a first DMA request, and the timer initiating a second DMA request causing a second transfer by the synchronous serial port responsive to timing out.

15. A method for providing synchronous serial communications using a microcontroller with a direct memory access (DMA) unit and a synchronous serial port, the method comprising the steps of:

configuring the synchronous serial port to provide DMA requests to a first DMA channel and then a second DMA channel;

configuring the first DMA channel to perform a series of DMA writes from a memory to the synchronous serial port in response to the DMA requests from the synchronous serial port to the first DMA channel;

configuring the second DMA channel to perform a series of DMA reads from the synchronous serial port to a memory in response to DMA requests from the synchronous serial port to the second DMA channel;

performing the series of DMA writes from memory to the synchronous serial port; and performing a series of DMA reads from the synchronous serial port to memory, wherein the series of writes followed by a series of reads are performed without execution unit intervention.

16. The method of claim 15, further comprising the step of providing a delay before the second DMA channel performs a series of DMA reads.

17. A microcontroller implemented as a single monolithic integrated circuit, comprising:

an execution unit, a synchronous serial port;

a direct memory access (DMA) unit; and means for performing a sequence of synchronous serial writes to the synchronous serial port immediately followed by a sequence of synchronous serial reads from the synchronous serial port without execution unit intervention, comprising:

means for configuring the synchronous serial port to provide DMA request to the direct memory access unit;

means for configuring the direct memory access unit to perform a sequence of synchronous serial writes to the synchronous serial port in response to the DMA requests; and means for configuring the direct memory access unit to perform a sequence of synchronous serial reads from the synchronous serial port after the sequence of synchronous serial writes in response to the DMA requests.

18. A microcontroller implemented as a single monolithic integrated circuit, comprising:

an execution unit;

a synchronous serial port;

a direct memory access (DMA) unit; and means for performing an alternating sequence of synchronous serial writes to the synchronous serial port and synchronous serial reads from the synchronous serial port without execution unit intervention, comprising:

means for configuring the synchronous serial port to provide DMA requests to the direct memory access unit; and means for configuring the direct memory access unit to perform an alternating sequence of synchronous serial writes to the synchronous serial port and synchronous serial reads from the synchronous serial port in response to the DMA requests.

* * * * *